United States Patent [19]
Burt

[11] Patent Number: 4,829,426
[45] Date of Patent: * May 9, 1989

[54] COMPUTER-IMPLEMENTED EXPERT SYSTEM AND METHOD FOR DECISION-MAKING

[75] Inventor: F. N. Burt, Bloomfield Hills, Mich.

[73] Assignee: Cogensys Corporation, La Jolla, Calif.

[ * ] Notice: The portion of the term of this patent subsequent to Jun. 17, 2003 has been disclaimed.

[21] Appl. No.: 864,162

[22] Filed: May 16, 1986

Related U.S. Application Data

[63] Continuation of Ser. No. 529,081, Sep. 2, 1983, Pat. No. 4,595,982.

[51] Int. Cl.$^4$ ............................................... G06F 1/00
[52] U.S. Cl. ................................................... 364/300
[58] Field of Search ......................................... 364/300

[56] References Cited

U.S. PATENT DOCUMENTS 4,595,982  6/1986  Burt ..................................... 364/300
4,648,044  3/1987  Hardy et al. .................... 364/300 X Primary Examiner—Raulfe B. Zache
Attorney, Agent, or Firm—Ratner & Prestia

[57] ABSTRACT

This invention relates to an expert system and method for decision making using computer generated paramorphic models of an expert's decisional process.

29 Claims, 2 Drawing Sheets

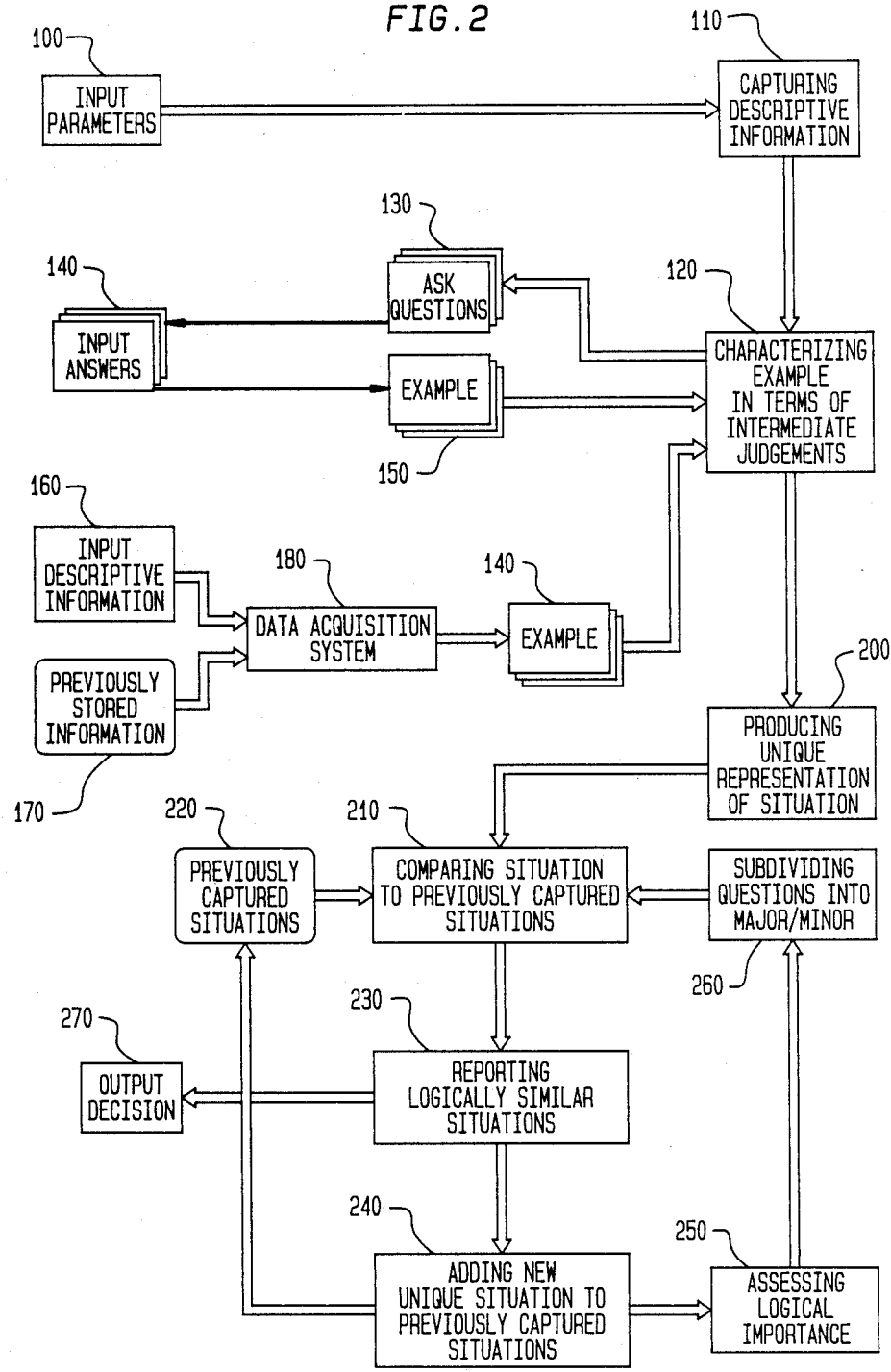

COMPUTER-IMPLEMENTED EXPERT SYSTEM AND METHOD FOR DECISION-MAKING

This application is a continuation of application Ser. No. 529,081, filed Sep. 2, 1983, now U.S. Pat. No. 4,595,982.

BACKGROUND OF THE INVENTION

A. Field of the Invention

This invention relate to expert systems and methods for decision making using computer-generated models of human decisional processes.

B. Background Art

Many systems have been proposed for use as "expert systems". Among them are Internist by Miller, Pople and Myers; Aesculapius by Shafer, Shafer, Foxlee, and Prost; and AQ11 by Michalski and Larson. These systems are "data driven", that is, they store and make decisions on the basis of values of individual data points. Analysis of these values allows the computer to apply explicitly programmed rules for decisions making. In such programs, the relative importance of the various data points, termed weighting, is arrived at by statistical analysis of the data itself or by the application of probabilistic estimates supplied from human sources. None of these systems has the ability to: "learn" by watching the process of an expert decision-maker; function in more than one problem sphere without extensive reprogramming; emulate the decision-making processes of its teachers; or measure the logical significance of the information it learns to use in dealing with a specific problem.

SUMMARY OF THE INVENTION

The present invention involves a computer-based system and method for making decisions within the sphere of a specific problem. An expert mentor provides descriptions of the specific information he uses (data) to make judgments within the sphere of the problem. The expert then makes representative decisions on the computer terminal, characterizing situations in terms of their data values. From this interaction, the computer system of this invention is able to generate an internal representation of the logical processes of the expert and to characterize each situation in terms of a series of intermediate judgments. As a result of structuring, the system of this invention can determine the relative logical importance of each of the data points and to classify each as being of major or minor significance. The system is able to compare the intermediate judgments characterizing any new situation with the stored set of intermediate judgments (the "judgment base") representing its view of the logical sphere of the problem. The logical significance of the new situation can be defined in terms of the major and minor logical differences from the reference situations so stored.

BRIEF DESCRIPTION OF THE DRAWINGS

FIG. 2 is a logic flow diagram of the method of the present invention.

DETAILED DESCRIPTION OF THE INVENTION

Figure 1:
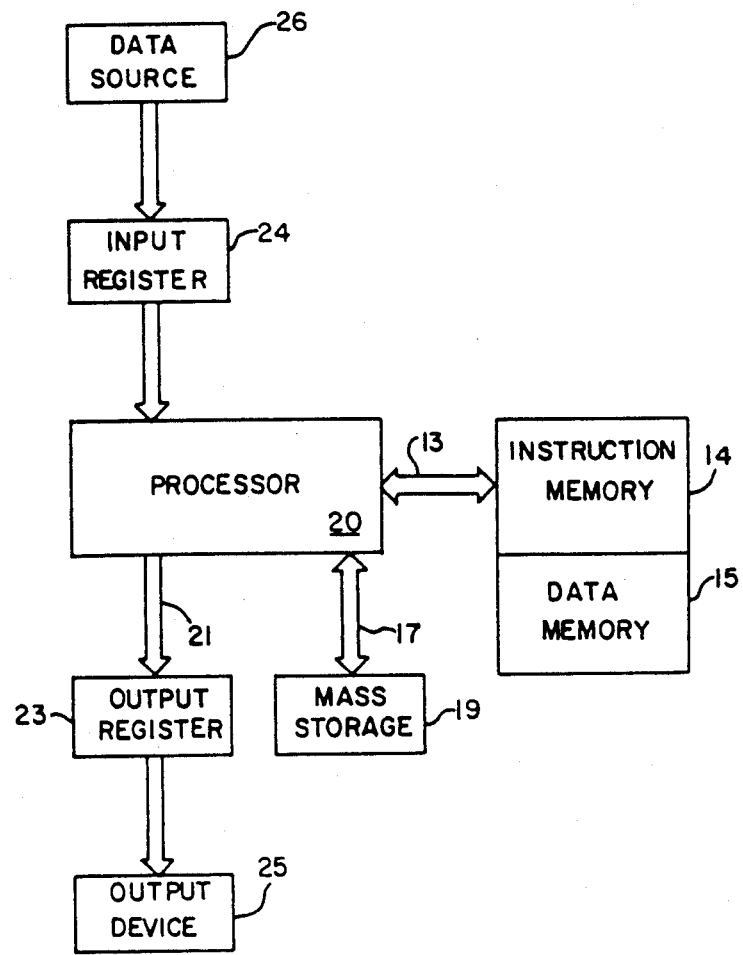
FIG. 1 is a block diagram of system components in the decision-making system.

Referring to the drawing, there is shown a block diagram of a decision-making system 10 which includes a processor or CPU 20 of the general purpose type which includes the ability to decode and execute instructions. CPU 20 communicates over bus 13 with memory 14 containing instructions from the program (called the "PARADOCS" program) which controls the operation of system 10. CPU 20 is also in communication over bus 13 with data memory 15 which is used during execution of the instructions stored in memory 14. Processor 20 is also in two-way communication over bus 17 with mass storage device 19 which is used for on-line information storage during program execution and at other times for non-volatile storage.

Processor 20 receives input via bus 22 from input register 24 which receives data from a suitable data input source such as a keyboard, magnetic tape reader, or card register. CPU 20 also transmits output via bus 21 to output register 23 and thence to a suitable data output device 25 which may be a cathode ray tube, printer, or modem.

In general, the PARADOCS program creates a paramorphic model of an expert's decision-making processes by construction of a judgment base. The judgment base contains information about the logical relationships among intermediate judgments used by the expert in his treatment of the problem area. The program is further able to display to users the logical relationships stored in the judgment base.

The PARADOCS program functions within a problem area which is defined by an expert. This expert must act as a mentor to "train" the program in the particular problem area by first giving definition to the data used in representing the problem. This is done by having the mentor list specific pieces of data needed for description of the problem area and providing parameters for each piece of data. These parameters include: (1) the name of the piece of data; (2) the units of measurement for the piece of data; (3) a range of values which has some logical significance for the piece of data; and (4) an indication as to whether entry of the data is always necessary in order to make a decision.

Data may be either scalar or dichotomous, that is, it may have a numeric value or it may be binary. If data is binary it would be either "YES" or "NO". If data is not binary, it is assumed to be scalar and the user will be asked to present a logical range associated with that piece of data. The logical range may be either a normal range, or a significant abnormal range. The mentor will then answer the question "Is this data required—Yes or No?"

The mentor is given the opportunity to define as many pieces of data as he feels are necessary to adequately deal with the problem area. The mentor then defines a reference state by entering a value for each piece of data in the problem area. Finally, the mentor enters an interpretation of what that reference state represents in terms of his professional experience.

The PARADOCS program then generates a "judgment base" against which it will evaluate all future data entered. It generates this judgment base by arriving at an "intermediate judgment" about each of the entered data points. This intermediate judgment is simply the logical relationship between the entered data and the range limits for that data point. That is, whether the data is: (1) Within range; (2) Above range; (3) Below range; (4) Entered without intermediate judgment; (5) Not Entered; (6) Deleted; (7) "No"; (8) "Yes". The judgment base changes dynamically as the PARADOCS program is shown more situations and integrates this experience into the judgment base. The judgment base also contains information about the relative logical significance of each piece of data. PARADOCS analyzes the effect of a change in a given piece of data on the conclusion state generated. It then assigns lesser relative weights to those which have a lesser effect on the totality of the conclusion states. The program then groups these data points and assigns "major" and "minor" classification to the data points.

In adding experiences to the judgment base, PARADOCS accepts only those situations which are logically distinct from all previously encountered situations. The judgment base is, therefore, a logically consistent body of information.

In use, a situation is presented simply by identifying the problem and entering the data representative of that example. The PARADOCS program then executes a series of procedures in order to analyze the significance of the presented situation and report that significance to its user.

PARADOCS examines the judgment base and attempts to determine if the judgment base contains an experience which is logically identical to the one being presented. If a logically identical experience exists in the judgment base, PARADOCS reports the interpretation of that experience as previously given to it by the mentor.

Failing in its attempt to find a logically identical situation in the judgment base, PARADOCS again examines the judgment base in an attempt to locate any experiences which are logically identical to the presented situation only with regard to the data points which are of "major" logical significance. If such experiences are located, PARADOCS reports the interpretation of those experiences along with the minor differences between the presented situation and the stored experience.

The third level of action is similar to the previous one and is used by the program only if no major identical situations are located. It attempts to locate experiences in the judgment base for which major data points match the presented situation to a specified degree. The program then reports the interpretation along with any major and minor differences between the presented situation and the stored experience.

The differences reported by the program can be used by the expert to modify his or her definition of the problem area and thereby refine the expertise of the PARADOCS model. This refinement of the program can take one of several forms: adding more data points to the problem area, deletion of a data point, reinstatement of a previously deleted data point, or "linking" into a new problem area. In any case, the program's performance is paramorphic; it behaves as the expert behaves in his refinement of the problem area.

In the event that the judgment base contains no experiences which are similar to the presented situation, PARADOCS reports this fact and requests that its mentor enter his or her interpretation of the presented situation. This interpretation is stored and the situation is integrated into the judgment base for future reference.

By continually expanding and recalculating the judgment base, the PARADOCS program can become independent of its mentor and operate to provide the benefit of "expertise" beyond even the direct experiences of its mentor to users other than its original mentor.

The PARADOCS program is also able to report to its users the internal structure of its judgment bases. This report is able to display the system's conclusion states and their definitions with regard to the logical interrelationships of the data to the reference state. In addition, the conclusion states which are logically most similar are grouped together.

The program is further able to display the logic of its mentor in a tree-structure and thus communicate the underlying processes of the expert's decisional processes.

Description of the Program

The PARADOCS program is composed of a series of interdependent program modules which perform the functions outlined above. These modules are the PROBLEM module, the ANALYSIS module, the REPORT module, the EXAMPLE module, the LISTING Module, the USERFILE module, the TREEPRNT module and the LINKPROB module. Although the modules contained in the appendix are coded in Pascal, it will be understood by one skilled in the art of computer software that any suitable language may be used to implement the functions of the PARADOCS program.

The program modules all create and maintain a series of data files on a mass storage medium of the following structures:

PROBLEM-FILE

RECORD 000:
  Problem-code
  Description
  Total Number of Questions
  Number Required - Major
  Number Not Required - Major
  Number Required - Minor
  Number Not Required - Minor
  Number of Times Used
  Topic Code
  Date First Entered
  Date Last Used
  Mentor Code
  Number of Situations
  Minimum Logical Importance for Major Data
  Calculate Logical Importance Flag
  Primary Problem Code
RECORDS 001-999:
  Question Number
  Question Description
  Yes/No Question
  Calculated Question Flag
  Unit Description
  Lower Limit
  Upper Limit
  Required:
  Logical Importance
  Experiential Importance
  Logical Interaction
  Experiential Interaction
  Logical Completeness
  Experiential Copleteness
  Status Code (Active, Deleted, Reinstated)

SITUATION-FILE

Situation Number
Short Situation Description
Next Situation Record Number
Problem Link Codes
  1

2
3
4
Author Code
Date First Entered
Date Last Used
Number of Times Encountered
Interpretation String

DESCRIPTION-FILE

Next Record Number
Situation Number
Text

USER-FILE

User Code
User Name
User Title
Address Line
  1
  2
  3
Phone Number
Maximum Status Code (Mentor, Teacher, User)
Printer?
Number of Problems Accessed
Date Put On System
Date Last Used System
Total Number of Times Used

USER-PROBLEM-FILE

Next Record Number
User Code
Problem Code
Status Code (Mentor, Teacher, User)
Number of Times Used

DATA-BASE RESPONSE FILE

Record 000:
  Primary Key
    Problem Code
    Date of Entry
    Sequence Number
    Record Number
  1st Secondary Key
    Problem Code
  2nd Secondary Key
    Problem Code
    Situation Number
  3rd Secondary Key
    User Code
  4th Secondary Key
    Example ID
  Additional Data
    Example Name
    Next Sequence Number
Record 01-N:
  Primary key
    Problem Code
    Date of Entry
    Sequence Number
    Record Number
  1st Secondary Key
    All Spaces
  2nd Secondary Key
    All Spaces
    Zero
  3rd Secondary Key
    All Spaces
  4th Secondary Key
    All Spaces
  Additional Data
    First Response
    Second Response
    Third Response
    Fourth Response The PROBLEM module is the mentor's method of access to the judgment base. The module first accepts a problem file code from the input device and determines whether that file exists. If the file does not exist, a name for the file is requested and the file is created. The new file will then be filled by entry of the data described above. Alternatively, an existing problem file may be altered in a similar manner. When all data has been entered, the program reevaluates the information about the problem stored in the PROBLEM-FILE at RECORD 000 and re-stores this information. The PROBLEM module then terminates.

The ANALYSIS module generates a situation table, an experience table and a computation table based on the history of the program's experience to date. The module calculates the logical importance (decimal fraction representing the ratio of defined situations which would be undistinguishable if the data point were deleted to the total number of situations), the experiential importance (decimal fraction representing the number of past experiences whose situations would no longer be distinguishable if that data point were deleted to the total number of past experiences for that situation), the logical completeness, the experiential completeness, the realization ratio, the number of possible situations, the number of situations until the model reaches the ability to discriminate, and the number of situations until the model reaches independence of the mentor, for each data point. Further, the PROBLEM-FILE is updated at RECORD 000 and the analysis is displayed to either the system console device or printer.

The EXAMPLE module is the mentor's, users' and teachers' access to the PARADOCS program. For the purpose of entering data descriptive of examples or of new situations, the module is used to obtain an interpretation of a presented situation. The module opens the correct files and accepts or calculates its own answers to each of the questions which define the problem of interest. The system makes intermediate judgments which are coded into an internal representation by formulation of situation strings which are then compared to the SITUATION-FILE as corrected for deletion of reactivation of questions to arrive at a conclusion. The system will also permit linkages to separate problems if required and will transfer all responses stored to date into a separate new judgment base.

The REPORT module generates a REPORT-FILE to the mass storage devices or other output device. The REPORT-FILE contains all information derived from the PARADOCS program in its analysis of a problem. The module generates a summary which includes a summary of the problem, and a description of each situation presented in terms of its differences from a common reference situation and from other logically similar situations.

The LISTING module simply generates a data entry form on the printer for a given problem in case an on-line terminal is unavailable. The questions and allowed answers are taken from the problem stored and formatted into a questionaire.

The USERFILE module allows access to the program's user records. These records control access to the program and define an individual as a mentor, teacher, or user for a given problem. It is this definition which controls the level of interaction allowed for a given operator during collection of data and construction of the paramorphic model.

The TREEPRNT module prints a "decision tree" from the experience of a PARADOCS problem model. This tree is a two dimensional representation of the problem space which graphically demonstrates the logical processes underlying the mentor's expertise.

Lastly, the LINKPROB module allows the definition of a special type of problem which is "linked" to another in a hierarchical manner. A primary problem interpretation may contain a link to one or more secondary problems. Thus, if the primary conclusion is reached, the linked problem may be invoked to further refine the judgment process. Up to 4 levels of linkages are allowed from any conclusion state.

Further information which, when taken with the drawing and claims, will enable those skilled in the art to make and practice the present invention is included herewith as Appendix A and Appendix B.

Appendix A is entitled "PARADOCS Technical Specifications Manual".

Parameters relating to questions, including those constituting type and reference are listed in Appendix A in the description of the SITUATION-FILE at Column 11.

Appendix B comprises the source code listing in the Pascal language of the PARADOCS program in accordance with the present invention. Also included in Appendix B are flowcharts of the procedures used in the program.

While the invention has been shown and described with reference to a specific set of computer instructions, i.e. Pascal, it will be understood that the spirit of this invention can be implemented in other computer languages and can be modified without avoiding the scope of the invention claimed herein.

The Appendices of U.S. Pat. No. 4,595,982 (which is commonly owned by the assignee of the present application) from Column 7, line 15, through Column 527, line 27 are hereby incorporated by reference.

I claim:

1. A method for making decisions within a problem sphere comprising steps performed by a computer of:
   (a) defining a logical sphere of the problem by capturing descriptive information according to questions having a type parameter and at least one reference parameter supplied and defined by an expert who acts as a mentor;
   (b) deriving from an answer to each question an intermediate judgment by comparing that answer to any reference parameters of the question;
   (c) defining a situation to be a set of intermediate judgments for all questions and one or more associated interpretations for all questions;
   (d) collecting and storing a set of situations which are unique in that no other situation has an identical combination of intermediate judgments;
   (e) assessing relative logical importance of each questions;
   (f) subdividing the questions into classes of major importance and minor importance;
   (g) presenting an example defined as answers to all the questions;
   (h) generating a situation from the example of step (g) and comparing that example situation to the set of unique situations stored in step (d); and
   (i) reporting those unique situations and their associated interpretations which are logically most similar in a fraction of their intermediate judgments to the example situation.

2. The method of claim 1 wherein step (d) comprises associating with each of said intermediate judgments an interpretation of said logical significance of observed changes in each intermediate judgment.

3. A method for making decisions within a problem sphere comprising steps performed by a computer of:
   (a) defining a logical sphere of the problem by capturing descriptive information according to questions having a type parameter and at least one reference parameter supplied and defined by an expert who acts as a mentor;
   (b) deriving from an answer to each question an intermediate judgment by comparing that answer to a reference parameter of the question;
   (c) defining a situation to be a set of intermediate judgments for all questions and the associated interpretation supplied by the mentor;
   (d) assessing relative logical importance of each question;
   (e) subdividing the questions into classes of major importance and minor importance;
   (f) presenting an example defined as answers to all the questions;
   (g) generating a situation from the example of step (f) and comparing that example situation to previously encountered situations and;
   (h) reporting those previously encountered situations and their associated interpretations which are logically most similar in a fraction of their intermediate judgments to the example situation.

4. The method of claim 3 wherein said descriptive information is a numerically described value.

5. The method of claim 3 wherein said descriptive information is an ordinally described value.

6. The method of claim 3 wherein said descriptive information is a Boolean (true/false) value.

7. The method of claim 3 wherein said descriptive information is membership in a predefined set.

8. The method of claim 3 wherein said descriptive information is a degree of similarity to a predefined pattern or structure.

9. The method of claim 3 wherein said descriptive information is a date, time or period of time.

10. The method of claim 3 wherein said descriptive information is calculated or derived from supplied data by application of a mentor-specified formula to said supplied data.

11. The method of claim 3 wherein the step of capturing said descriptive information is performed by interactive questioning of a human with knowledge of said information.

12. The method of claim 3 wherein the step of capturing said descriptive information is performed by directly interfacing the practitioner of the method to a data acquisition system chosen to provide required information by accessing previously stored data, or by transducing physical phenomena.

13. The method of claim 3 wherein step (h) includes reporting in rank order of logical similarity.

14. The method of claim 3 wherein step (h) includes rendering a decision by reporting the associated interpretation of the previously encountered situation which is most logically similar to the example situation.

15. The method of claim 3 wherein said reference parameter is a numeric value.

16. The method of claim 3 wherein said reference parameter comprises a numeric range.

17. The method of claim 3 wherein said reference parameter comprises a plurality of numeric ranges.

18. The method of claim 3 wherein said reference parameter comprises a Boolean value.

19. The method of claim 3 wherein said reference parameter comprises a predefined set.

20. The method of claim 3 wherein said reference parameter comprises a predefined pattern or structure.

21. The method of claim 3 wherein step (d) comprises comparing a proportion of previously encountered situations which are logically distinguishable only by reference to a particular intermediate judgment to a total number of intermediate judgments within said problem sphere.

22. The method of claim 3 wherein step (d) comprises comparing a proportion of previously encountered situations which are logically distinguishable only by reference to a particular intermediate judgment to a total number of intermediate judgments within a class of intermediate judgments within said problem sphere.

23. The method of claim 22 wherein said class is the intermediate judgments of major importance.

24. The method of claim 3 wherein the step of generating a situation (g) comprises classifying said answers as being either present or absent.

25. The method of claim 3 wherein the step of generating a situation (g) comprises classifying said answers as being either below or above a mentor-supplied value.

26. The method of claim 3 wherein the step of generating a situation (g) comprises classifying said answers as being either within or outside of a mentorsupplied range of values.

27. The method of claim 3 wherein the step of generating a situation (g) comprises classifying said answers as being either above or below a mentor-supplied range.

28. The method of claim 3 wherein the step of generating a situation (g) comprises classifying said answers as being either matching or not matching a mentorsupplied pattern.

29. The method of claim 3 wherein the step of generating a situation (g) comprises classifying said answers as being either true or false.

* * * * *